March 16, 1965 M. C. VOSBURGH ETAL 3,174,147
DOPPLER RADAR SYSTEM
Filed May 20, 1960 4 Sheets-Sheet 1

INVENTORS.
MALCOLM C. VOSBURGH
SHYAM M. KHANNA
BY
Isidore Togut
ATTORNEY

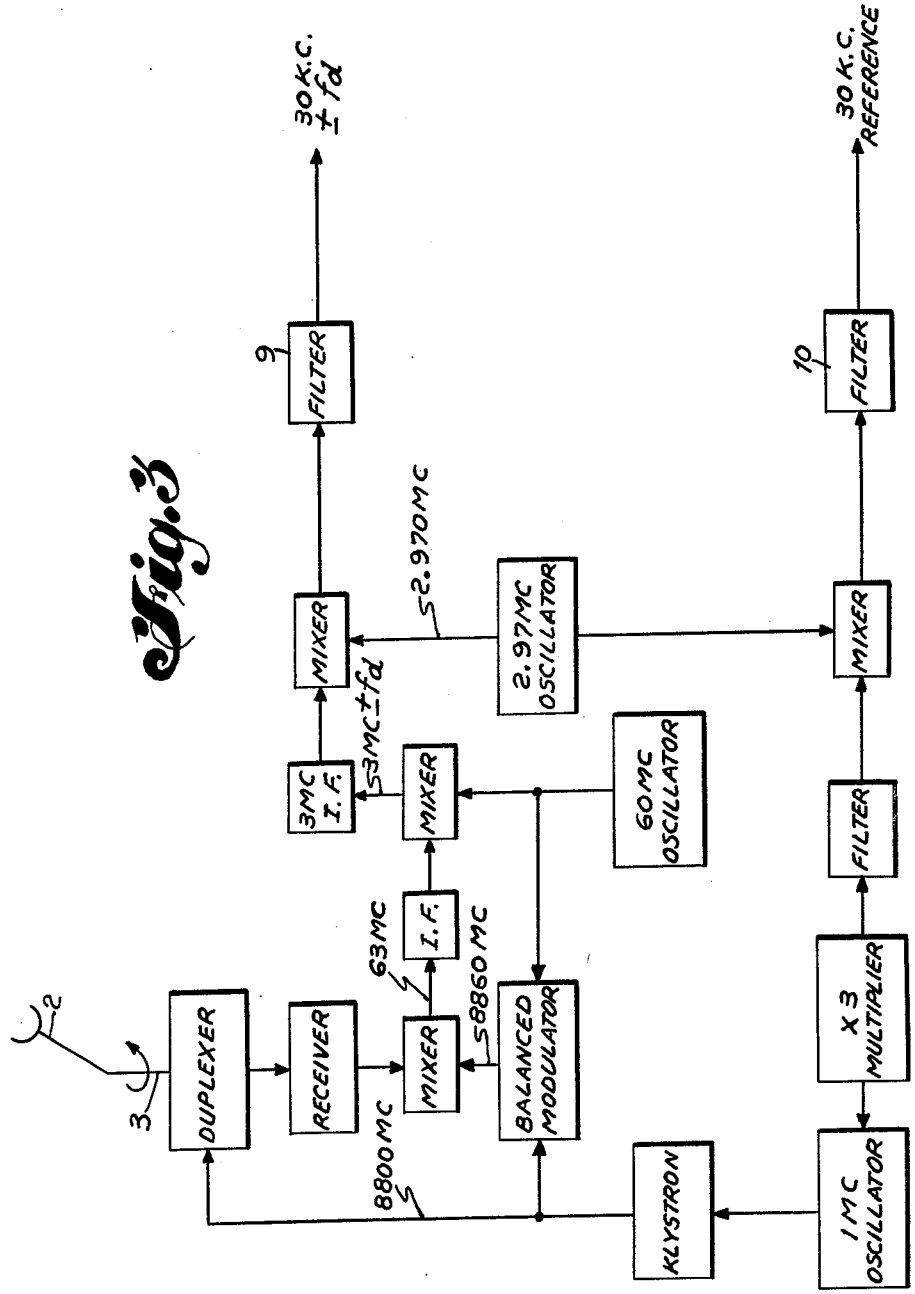

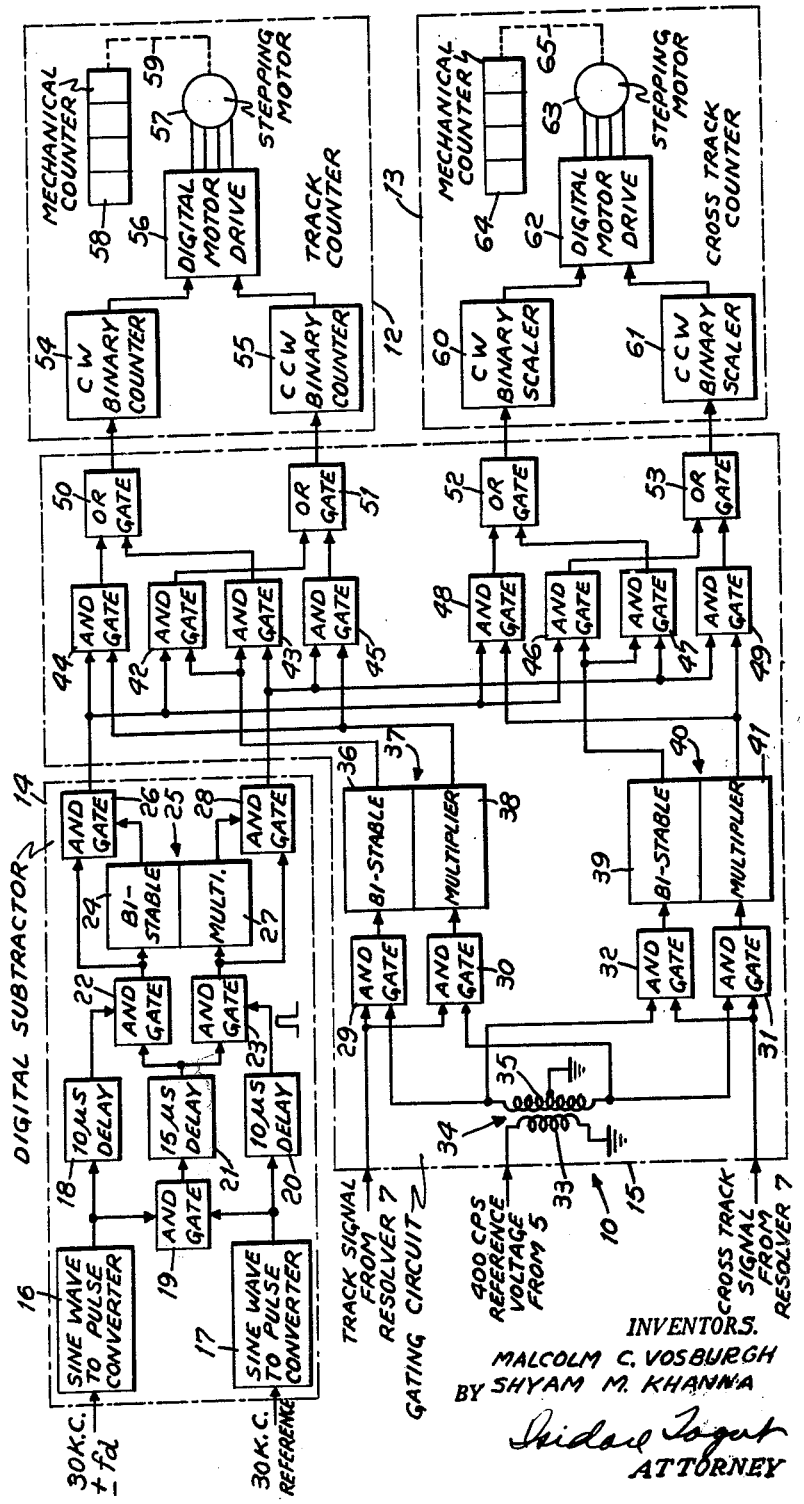

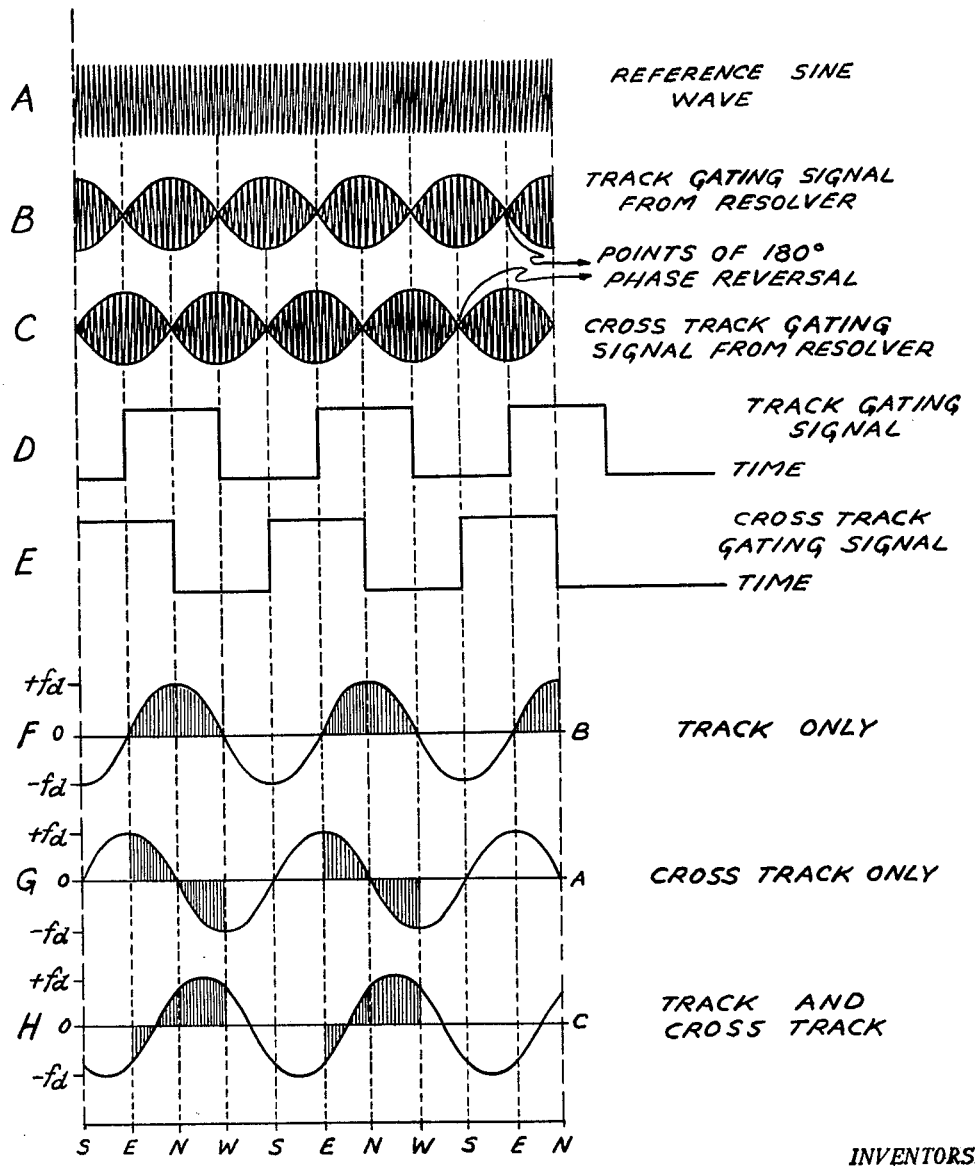

3,174,147
DOPPLER RADAR SYSTEM
Malcolm C. Vosburgh, Montclair, and Shyam M. Khanna, Nutley, N.J., assignors to International Telephone and Telegraph Corporation, Nutley, N.J., a corporation of Maryland
Filed May 20, 1960, Ser. No. 30,575
15 Claims. (Cl. 343—12)

This invention relates to doppler radar systems and more particularly to a system which utilizes the digital nature of the doppler frequency to determine position information.

A number of antenna beam configurations have been successfully used in doppler radar systems. In all cases they consist of a number, two, three or four, of fixed beams which are simultaneously or sequentially operative. The three and four beam systems employ the so-called Janus principle in which the doppler frequency detected on one beam is compared with that on a similar beam disposed 180 degrees to the first. This Janus technique greatly reduces the antenna stabilization requirements and in the case of coherent Janus systems permits measurement of vertical as well as horizontal velocities. The doppler cycles need only be counted to give the distance traveled without ever having expressed the doppler as a frequency or as a shaft position. The doppler radar systems now in use require extensive frequency tracking equipment and computers to derive the velocity information, the drift angle and the distance traveled. In general, these systems fail to utilize the digital nature of the doppler frequencies to derive information. In the copending application of Malcolm C. Vosburgh-Joseph Murgio, Serial No. 805,167, filed April 9, 1959, a new type of doppler radar system is described wherein the digital nature of the doppler frequencies is used to derive position information. In most of the available doppler navigation systems the doppler information contained in the receiver output is processed in an analog frequency tracker whose output represents the velocity vector with respect to the aircraft heading. This velocity vector is then resolved into the reference frame and integrated to produce the two components of distance traveled in the reference frame. This may be done in either an analog or digital fashion. In the above-cited case, a frequency tracker is utilized to derive drift angle and velocity information, and an intermediate frequency output is synthesized as the output of the frequency tracker and then converted into digital signals. However, to determine the distance traveled, it is not necessary to utilize a frequency tracker, since it is not required to have the velocity and drift angle information. It is thus possible to effectuate substantial saving in the equipment required on board the vehicle.

It is an object of this invention to provide doppler radar system utilizing simplified and inexpensive electronic circuitry and components.

It is another object to provide a doppler radar system which utilizes directly the digital nature of the doppler frequencies to derive the distance traveled information of the vehicle carrying the system.

A feature of this invention is a doppler radar system for use on board a vehicle to determine the position of the vehicle relative to a reradiating element (i.e., the earth). There is provided a source of radio signals which are transmitted in a circular scan antenna beam pattern about a nearly vertical axis towards the element. The received reradiated signals from the element are then processed to derive intermediate frequency signals containing the doppler frequency. These intermediate frequency signals are then directly converted to digital signals and in conjunction with resolving means and accumulation the position change of the vehicle can be ascertained.

Another feature is the provision of means to correlate the intermediate frequency digital signals with the position of the antenna beam to derive from this correlation of the digital signals and the antenna beam the movement of the vehicle with respect to the earth.

A further feature is the provision of means to provide reference coordinates for a predetermined path for the vehicle. The intermediate frequency signals containing the doppler frequency are converted to digital signals and these doppler frequency digital signals are separated into a first group containing doppler frequencies derived from intermediate frequency signals of higher frequency than the intermediate frequency of the receiver, and a second group containing doppler frequencies derived from intermediate frequency signals of lower frequencies than the intermediate frequency. Gating means are provided responsive to antenna rotation to resolve the doppler frequency digital signals of the first and second groups according to the time of transmission of the radio signals with relation to the predetermined path as defined by the reference coordinates. The digital doppler signals are then counted according to this resolution, and the distance traveled information of the vehicle with relation to the reference coordinates is then ascertained and indicated.

These and other objects and features of this invention will become more apparent by reference to the following description taken in conjunction with the accompanying drawings, in which:

FIG. 3 is a block diagram of the transmitter and receiver section of the system diagram of FIG. 2;

FIG. 4 is a diagram of the digital processing section of the block diagram of FIG. 2; and FIG. 5 is a group of waveforms useful in explaining the gating technique of this invention.

If a moving aircraft radiates a wave towards the ground so as to be sensitive to some component of the velocity vector, the received frequency differs from the transmitted frequency by an amount $f_d$ known as the doppler shift. In a doppler navigation system, the count of doppler cycles is directly a meaure of distance covered in the direction of the received signal when the counting is done in a fixed frame of reference. In a doppler system both distance and direction in which the aircraft has flown are essential for navigation. The direction in which the antenna beam points determines the reference to which all the velocity vectors will be resolved. If the beam was pointing North, cycle counting will give only the North component of distance traveled. Similarly, another beam pointing East may be utilized to determine distance covered in the East direction. One method of obtaining this result would be to stabilize a pencil beam pointing North and another pencil beam pointing East by means of a reference gyroscope or compass. The navigation system of this invention obtains the same results by using a rotating pencil beam and sorting the data obtained into the proper components. A gyroscope or a compass provides directional reference for sorting. When the beam is pointing North, all the data is switched to North counters; when the beam points East, data is switched to the East counters. The counters then indicate distance traveled North and distance traveled East.

Figure 2:
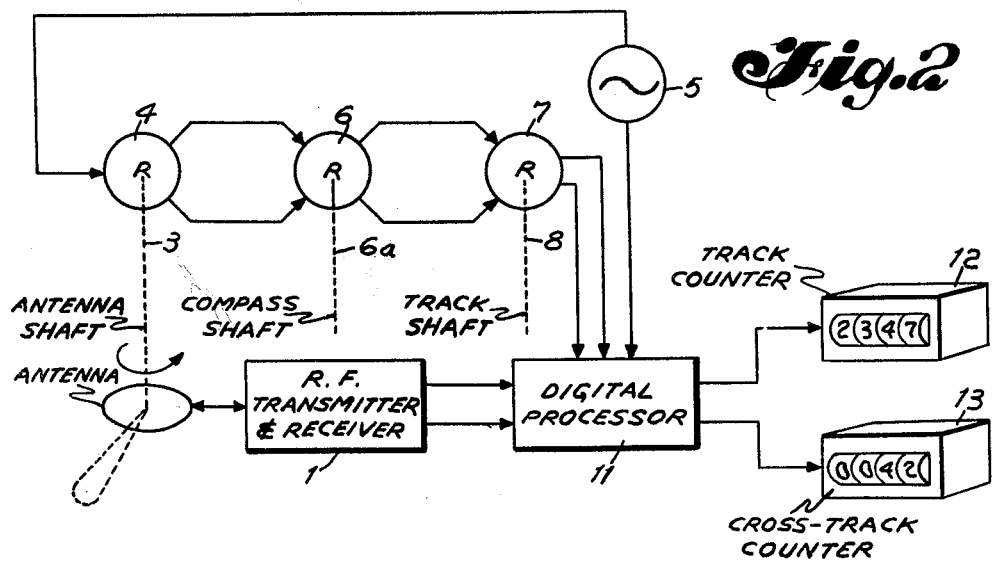
FIG. 2 is a system block diagram.

Referring now to FIG. 2, there is shown the system block diagram of this invention. A transmitter and receiver 1 is coupled to a rotating antenna 2, the axis of the radiating beam thereof being disposed at an offset angle from the vertical axis of rotation 3 of the antenna shaft.

Figure 1:
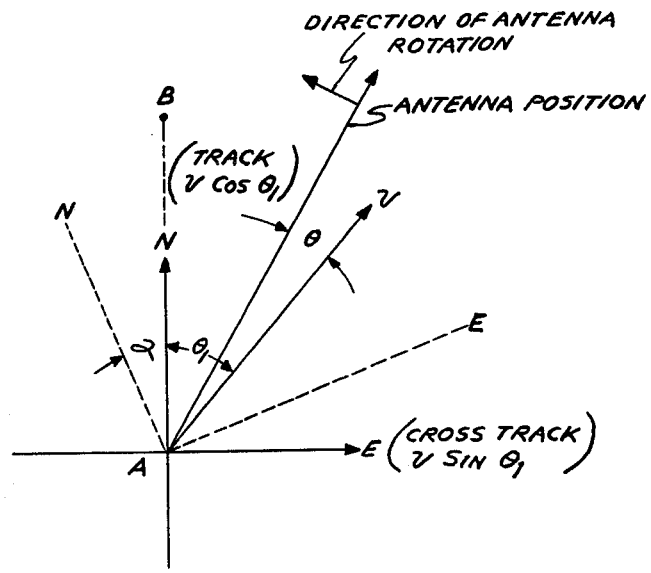
FIG. 1 is a geometric diagram to illustrate the theory and operation of this invention.

A resolver 4 is mechanically coupled to the antenna shaft 3, thereby rotating the rotor of the resolver at the same rotation rate as the antenna rotation. A generator 5 is coupled to the primary of the resolver 4 to provide a reference sine wave signal in the frequency, for example, of 400 c.p.s. The secondary of resolver 4 is coupled to the primary of a resolver 6. The rotor of resolver 6 is mechanically coupled to the compass shaft 6a of a magnetic compass (not shown). The compass shaft 6a is turned to the magnetic north direction. The secondary of resolver 6 is coupled to the primary of a resolver 7 and the rotor of the resolver 7 can be turned to indicate any direction along which the vehicle is to fly. This resolver by means of the track shaft 8 is under the pilot's control and the frame of reference can thus be rotated from the North-East coordinates to fictitious North-East coordinates which can be called track and cross-track. The track direction which is set in on the resolver 7 determines the path along which the aircraft desires to fly. The track counter, to be described later, will then indicate the distance from the point of departure or from the destination depending on the mode of operation. The cross-track counter will indicate the deviation in miles left or right from the desired path. Referring to FIG. 1, the geometry of the problem is shown. The magnetic North-East coordinates as determined by the compass shaft adjustment of resolver 6 is shown in broken lines. It is desired to fly from point A to point B. The pilot will then rotate the track shaft 8 coupled to the rotor of resolver 7 through angle $\alpha$ thereby rotating the frame of reference from the North-East coordinates to the fictitious North-East coordinates shown by the solid lines. The output of the resolver 4 is the 400 c.p.s. reference signal modulated by the antenna scan rate. Resolver 6 changes the phase of the envelope directly as the pointing of the aircraft changes with reference to the compass North. Resolver 7 changes the phase of the envelope to the artificial N-E coordinates with refernce to the magnetic North setting of resolver 6. The output of the resolver 7 is then the reference signal output of the generator 5 modulated by the antenna rotation or scan rate and representing the sine and cosince functions of the angle of rotation of the antenna scan pattern modified by the shaft settings of resolvers 6 and 7 to represent the sine and cosine of antenna scan angle with respect to the fictitious North-East coordinate system.

In FIG. 3, there is shown a diagram of the transmitter and receiver section of the system diagram of FIG. 2. This receiver-transmitter section is conventional in operation and will not be further described. The output of the receiver from the filter 9 is the intermediate frequency signal together with the Doppler frequencies. The output of the filter 10 is the intermediate frequency reference signal only. The values shown in the respective portions of the transmitter-receiver for the different frequencies are representative only and are not to be construed as any limitation of this invention. With reference now to FIGS. 2 and 4, there is shown the digital processor 11 and the track and cross-track counters 12 and 13 respectively. The digital processor 11 comprises a digital subtractor 14 for deriving the Doppler digital frequencies and a gating or switching circuit 15 for resolving the output of the digital subtractor 14 according to the time of transmission and reception of the radio signals with relation to the predetermined path. The output of filter 9 is coupled to a sine wave to pulse converter 16 and the output of filter 10 is coupled to another sine wave to pulse converter 17 to provide digital signals representing respectively the intermediate frequency signals with the Doppler signals and the intermediate frequency reference signal only. The output of converter 16 is coupled to a 10 microsecond delay circuit 18 and an AND gate 19. The output of converter 17 is coupled to another 10 microsecond delay circuit 20 and to AND gate 19. The output of AND gate 19 is coupled to a 15 microsecond circuit 21. The output of delay circuits 18 and 21 are fed to an AND gate 22 and the output of delay circuits 21 and 20 are coupled to an AND gate 23. The output of AND gate 22 is coupled to one section 24 of a bistable multivibrator 25 and to an AND gate 26. The output of AND gate 23 is coupled to the second section 27 of multivibrator 25 and to AND gate 28. The output of section 24 of multivibrator 25 is coupled to AND gate 26 and the output pulse section 27 of multivibrator 25 is coupled to AND gate 28. In the digital subtractor 14, the reference intermediate frequency pulses are subtracted from the intermediate pulses containing the Doppler pulses to give true Doppler frequency pulses. When the intermediate frequency plus Doppler frequency pulses are higher than the reference intermediate frequency pulses, the difference appears in the output of AND gate 26, when lower it appears in the output of AND gate 28. For a signal to appear at the output of AND gate 26 or AND gate 28, both inputs to each AND gate must be negative and appear simultaneously. In practice, the two states of the multivibrator 25 do not have the same trigger sensitivity. When two inputs to the multivibrator 25 are energized simultaneously, the multivibrator 25 tends to go into the preferred state instead of remaining uneffected. This problem is eliminated by the addition of AND gates 19, 22 and 23 and the delay circuits 18, 20 and 21 as a coincidence detector and an inhibit switch. Whenever two pulses are present on the two lines simultaneously, the AND gate 19 detects the overlap and inhibits the input to the multivibrator 25. The delay is included on both lines so that the inhibiting action occurs before pulses reach the inputs of the multivibrator 25. The multivibrator 25 has a finite resolution time. In the reduction to practice of this invention it was found to be about 10 microseconds. In case pulses arrive on the two lines closer than 10 microseconds, the multivibrator 25 will fail to change state in accord with the input. This problem is eliminated by making the input pulses to the multivibrator 25 10 microseconds wide. If pulses on the two lines now overlap, the AND gate 19 will inhibit the input to the multivibrator 25 unless they are more than 10 microseconds apart.

The gating or switching signals are generated by determining the instant at which the center of the antenna beam crosses the track and cross-track axes and by observing the signs of the Doppler shift. The antenna shaft resolver 4 provides antenna position information, the compass shaft resolver 6 gives fixed reference North, while the track shaft resolver 7 gives the offset angle from the fixed North reference. The phase reversals in the outputs from the resolver chain determines the instants of crossing the reference axes. The basic gating technique is illustrated with reference to FIGS. 1 and 5. Let the velocity vector be $v$ at an angle $\theta_1$ with respect to track direction and let the angle between the velocity vector and the instant position of the rotating antenna be $\theta$. The components of $v$ along track and cross-track direction are given by $$v_{\text{track}} = v \cos \theta_1 \quad (1)$$

$$v_{\text{crosstrack}} = v \sin \theta_1 \quad (2)$$

It can be shown that Doppler shift $f_d = Kv$. Therefore, Doppler shift corresponding to (1) and (2) is given by $$f_d \text{ track} = Kv \cos \theta_1 \quad (3)$$

$$f_d \text{ crosstrack} = Kv \sin \theta_1 \quad (4)$$

Doppler shift obtained from the rotating antenna is given by $$f_d = Kv \cos (\theta_1 - \theta) \quad (5)$$

Gating in the track direction, we have $$f_d \text{ track} = Kv \int_{-\pi/2}^{+\pi/2} \cos (\theta_1 - \theta) \, d\theta$$

$$= 2Kv \cos \theta_1 \quad (6)$$

Similarly, it may be shown that in crosstrack direction $$f_d \text{ crosstrack} = 2Kv \sin \theta_1 \quad (7)$$

The results obtained in (6) and (7) are the same as derived in (3) and (4) except for a factor of 2. This factor arises from the fact that full wave switching is implied in the rotating antenna analysis.

The gating circuit will now be described. The track signal output of resolver 7 is coupled to AND gates 29 and 30. The cross track signal output of resolver 7 is coupled to the inputs of AND gates 31 and 32. The reference signal output of generator 5 is coupled to a primary winding 33 of a transformer 34 having a split secondary 35. One output of the split secondary 35 is coupled to AND gates 29 and 32 and the other output of secondary 35 is coupled to AND gates 30 and 31. The output of AND gate 29 is coupled to one section 36 of a bistable multivibrator 37; the output of AND gate 30 being coupled to the second section 38 of multivibrator 37. The output of AND gate 32 is fed to one section 39 of a bistable multivibrator 40 and the output of AND gate 31 is fed to the second section 41 of multivibrator 40. The output of section 36 of multivibrator 37 is coupled to AND gates 42 and 43. The output of the second section 38 is coupled to AND gates 44 and 45. The output of section 39 of multivibrator 40 is coupled to AND gates 46 and 47. The output of section 41 of multivibrator 40 is coupled to AND gates 48 and 49. The output of AND gate 26, which is the Doppler frequency derived when the intermediate frequency signals containing the Doppler signal is greater than the reference intermediate frequency signal, is coupled to AND gates 44, 42, 46 and 48. The output of AND gate 28 is coupled to AND gates 43, 45, 47, and 49. The outputs of AND gates 43 and 44 are coupled to the input of an OR gate 50; the output of AND gates 42 and 45 are coupled to the input of an OR gate 51. The output of AND gates 47 and 48 are coupled to OR gate 52 and the output of AND gates 46 and 49 are coupled to OR gate 53. The output of OR gate 50 is coupled to a clockwise binary counter 54 of the track counter 12 and the output of OR gate 51 is coupled to a counterclockwise binary counter 55. The output of binary counters 54 and 55 are coupled to a digital motor drive 56; and the output of the digital motor drive 56 is coupled to a bi-directional stepping motor 57. The direction of rotation of the stepping motor is controlled by the digital motor drive 56 which in turn is derived from the switching arrangement. The stepping motor 57 drives a bi-directional mechanical counter 58 by means of a shaft 59. Similarly, for the crosstrack counter 13, the output of OR gate 52 is coupled to a binary counter 60 and the output of OR gate 53 is coupled to a binary counter 61, the outputs of which counters are fed to a digital motor drive 62. The output of digital motor drive 62 controls the operation of a bi-directional stepping motor 63 which drives a mechanical counter 64 by means of shaft 65. Positive and negative Doppler information is routed to the binary counters 54 and 55 respectively of the track counter 12 and to binary counters 60 and 61 respectively of crosstrack counter 13. The output of the binary counters 54 and 60 control the clockwise rotation of the stepping motor 57 and 63 and the outputs of the binary counters 55 and 61 control the counterclockwise rotation of the stepping motors 57 and 63.

The logic employed in track switching or for the case where the aircraft is flying due North with no deviation from the path is as follows: If we assume the start of the switching cycle in the East direction with the antenna rotating counterclockwise, then it is apparent that when the antenna is in the 180 degree north sector, the output of the digital subtractor 14 will be $+f_d$ from the AND gate 26. The track signal from the resolver 7 will be in phase during that time with the reference signal from the secondary 35 of the transformer 34 which is coupled to the AND gate 30. The pulse from the AND gate 30 will place section 38 of the multivibrator 37 in clamp and produce an output therefrom which will be fed to AND gates 44 and 45. However, since there is a $+f_d$ input appearing at the AND gate 44, there will occur an output from the AND gate 44 only which will be coupled to the OR gate 50 and produce an output therefrom which will be fed to the clockwise binary counter 54. The output of the clockwise binary counter 54 will then, through the digital motor drive, drive the stepping motor 57 to indicate a positive count on the mechanical counter 58 of the Doppler cycles. During this 180 degree rotation of the antenna in the north section, there are two signals in the cross track signal input. The first one is a 90 degree leading or lagging signal, as the case may be, which is out of phase with the track signal. For the first 90 degree rotation of the antenna, this cross track signal will be in phase with the reference voltage from the other half of the transformer secondary 35 and will, therefore, produce an output from AND gate 32, the output of which in turn will place section 39 of the bistable multivibrator 40 in clamp and produce an output therefrom. This output will be coupled to AND gate 46 together with the output of multivibrator section 39 to produce an output of the AND gate 46 which will be fed to OR gate 53, and produce an output therefrom that is coupled to the counterclockwise binary scaler 61 of the cross track counter 13. This output will, through the digital motor drive 62, drive the stepping motor 63 to the track from the binary counter 64 a negative count, or subtraction, of Doppler signals in the first 90 degree scan as indicated above. For the next 90 degree scan of the antenna, that is, from north to west, there occurs a phase reversal of the cross track signal from the resolver which produces an output from AND gate 31 that, in turn, feeds into multitvibrator section 41 placing that section in clamp and producing an output therefrom which is coupled to AND gate 48. The positive Doppler output of AND gate 26 is also fed into AND gate 48 producing an output therefrom which is coupled to the OR gate 52. The output of OR gate 52 is fed into the clockwise binary scanner 60 of the cross track counter 13 and through the digital motor drive 62 and the stepping motor 63 produces a positive count or addition of the mechanical counter 64. The net result then of the subtraction and addition process of the digital pulses in the cross track chain is zero, which is to be expected in view of the fact that the aircraft is proceeding due north and there would be no Doppler output in the cross track direction. With the aircraft flying due north and the antenna now sweeping the 180 degree south sector from west to east, the process is similar to provide a positive count in the track counter 12 and a net zero count in the cross track counter 13. As the antenna scans in the south sector, there is produced a negative Doppler output from the AND gate 28 which is coupled to the track chain AND gates 43 and 45. There has also occurred a 180 degree phase reversal of the track signal from the resolver which will then produce an output from AND gate 29. This output will place multivibrator section 36 in clamp and produce an output therefrom which is coupled to AND gates 42 and 43. Since there is a negative Doppler input to AND gate 43 and no Doppler input to 42, there will be produced an output from AND gate 43 which will be coupled to the input of OR gate 50. This produces an output which is fed to the clockwise binary counter 54 and the output of counter 54 through the digital motor drive 56 to stepping motor 57 will produce a positive counter in the mechanical counter 58. Similar to the operation of the cross track circuits for the Doppler count in the north sector scan of the antenna, the net count of the south sector scan in the mechanical counter 64 will be zero. If the path of the aircraft is in a direction which is between the track and cross track directions, then the net count in the track counter will be a cosine function of the deviation angle $\theta_1$ from the north reference and the net count in the cross track counter will be the sine function of the deviation angle $\theta_1$. FIG. 5 illustrates the switching process by means of the pertinent waveforms. Waveform A is the reference sine wave signal; B and C are, respectively, the track and cross track gating signals from the resolver 7; D is the track gating signal; E is the cross track gating signal; F is a waveform of the Doppler signals which are secured in the track counter 12 during the 180 degree north sector scan of the antenna; G is the Doppler signals received in the cross track counter 13 during the time of the scan as described above. The illustrations in this case are only for half a cycle scan. For the complete cycle, there is a repetition of the process with the Doppler count going into the appropriate binary counter in each of the track and cross track counter circuits. H is a waveform illustrating the case where the aircraft is traveling on a path between the track and cross track directions. The Doppler frequencies will then produce a net count on both the track and cross track counters to indicate the distance traveled on the predetermined path and the deviation of the aircraft from the predetermined path.

While we have described above the principles of our invention in connection with specific apparatus, it is to be clearly understood that this description is made only by way of example and not as a limitation to the scope of our invention as set forth in the objects thereof and in the accompanying claims.

We claim:

1. A Doppler radar system for use on board a vehicle to determine the change in position of said vehicle relative to a reradiating element comprising a source of radio signals, means to transmit said signals in a circular scan antenna beam pattern towards said element, means to receive reradiating signals from said element, means to derive intermediate frequency signals from said received signals containing the Doppler frequency, means to convert said intermediate frequency signals to digital signals, means to count the cycles of the Doppler frequency digital signals and means to derive from said count of the cycles of the Doppler digital signals the change in position of said vehicle.

2. A Doppler radar system for use on board a vehicle to determine the position of said vehicle relative to a reradiating element comprising a source of radio signals, a rotating beam antenna, means to transmit said signals in a circular scan antenna beam pattern towards said element, means to receive reradiating signals from said element, means to derive intermediate frequency signals from said received signals containing the Doppler frequency, means to convert said intermediate frequency signals to digital signals, means to count the cycles of the Doppler frequency digital signals means to resolve said Doppler digital signals with the position of said rotating beam, and means to derive from said resolving of said Doppler digital signals and said rotating beam the position of said vehicle.

3. A Doppler radar system for use on board a vehicle to determine the position of said vehicle relative to a reradiating element comprising a source of radio signals, a rotating beam antenna, means to transmit said signals in a circular scan beam pattern towards said element, means to receive reradiated signals from said element, means to derive intermediate frequency signals from said received signals containing the Doppler frequency, means to convert said intermediate frequency signals to digital signals, means to count the cycles of the Doppler frequency digital signals, means to resolve said Doppler digital signals with the position of said rotating beam, and means to derive from said resolving of said Doppler digital signals and said rotating beam the position of said vehicle.

4. A Doppler radar system for use on board a vehicle relative to a reradiating element comprising a source of radio signals, a beam radiating antenna coupled to said source and adapted to rotate about a given axis offset from the axis of said antenna, means to provide reference coordinates for a predetermined path for said vehicle, means to transmit said signals in a circular scan antenna beam pattern towards said element, means to receive reradiated signals from said element containing the Doppler frequency, means to derive intermediate frequency signals containing the Doppler frequency from said received signals, means to convert said intermediate frequency signals to digital signals, means to correlate said digital signals with the position of said antenna beam, and means to derive from said correlation of digital signals and said antenna beam the position of said vehicle relative said reference coordinates.

5. A doppler radar system according to claim 4 wherein said means to provide reference coordinates for a predetermined path comprises means to provide fixed geographical reference coordinates and means to rotate said geographical reference coordinates to a direction coinciding with said predetermined path.

6. A Doppler radar system according to claim 5 wherein said means to convert said intermediate frequency signals to said digital signals comprises means to derive digital signals of the doppler frequency, means to separate said doppler frequency digital signals into a first group containing doppler frequencies derived from intermediate frequency signals of higher frequency than the intermediate frequency of said receiving means, and a second group containing doppler frequencies derived from intermediate frequency signals of lower frequency than said intermediate frequency of said receiving means.

7. A doppler radar system according to claim 6 wherein said correlation means includes gating means to resolve said doppler frequency digital signals of said first and second groups according to the time of transmission and reception of said radio signals in relation to said predetermined path.

8. A doppler radar system for use on board a vehicle relative to a reradiating element comprising a source of radio signals, a beam radiating antenna coupled to said source and adapted to rotate about a given axis offset from the axis of said antenna, means to provide reference coordinates for a path for said vehicle and to provide signals representing the position of said antenna beam relative said predetermined path, means to transmit said signals in a circular scan antenna pattern towards said element, means to receive reradiated signals from said element containing the doppler frequency, means to derive intermediate frequency signals containing the doppler frequency from said received signals, means to convert said intermediate frequency signals to digital signals, means to derive the digital doppler frequency from said intermediate frequency signals, means to separate said digital doppler signals into a first group received when said antenna beam is pointing in a direction coinciding substantially with the forward movement of said vehicle and a second group of signals received when the antenna beam is pointing in a direction substantially opposite the forward movement of said vehicle, means to count and record the cycles of the doppler signals of said first and second group to determine the position of said vehicle.

9. A doppler radar system for use on board a vehicle relative to a reradiating element comprising a source of radio signals, a beam radiating antenna coupled to said source and adapted to rotate about a given axis offset from the axis of said antenna, means to provide reference coordinates for a predetermined path of said vehicle, means coupled to said antenna and to said means to provide reference coordinates to provide signals representing the position of said antenna beam relative said predetermined path, means to transmit said signals in a circular scan antenna pattern towards said element, means to receive reradiating signals from element containing the doppler frequency, means to derive intermediate frequency signals containing the doppler frequency from said received signals, means to convert said intermediate frequency signals to digital signals, means to derive the digital doppler frequency from said intermediate frequency signal and to separate said digital doppler signals into a first group containing doppler frequencies derived from the intermediate frequency signals including the doppler signals greater than the intermediate frequency of said receiver, and a second group containing doppler frequencies derived from the intermediate frequency signals containing the doppler signal less than the intermediate frequency of said receiving means, means to derive digital signals representing the position of said antenna beam relative to predetermined path, means responsive to the coincidence of said digital doppler signals of said first and second group and said digital signal representing said antenna position to separate said digital signal of said first and second groups into digital signals representing the movement of said vehicle along said predetermined path and any deviation of said vehicle from said predetermined path.

10. A doppler radar system for use on board a vehicle relative to a reradiating element comprising a source of radio signals, a beam radiating antenna coupled to said source and adapted to rotate about a given axis offset from the axis of said antenna, means to provide reference coordinates for a predetermined path for said vehicle, means coupled to said antenna and to said means to provide reference coordinates to produce output signals representing the position of said antenna beam relative said predetermined path, means to transmit said signal in a circular scan antenna pattern towards said element, means to receive reradiated signals from said element containing the doppler frequency, means to derive intermediate frequency signals containing the doppler frequency from said received signals, means to convert said intermediate frequency signals into digital signals, means to derive digital doppler signals from said intermediate frequency digital signals and means to separate said digital doppler signal into a first group of doppler signals received during the time when said antenna beam was pointing in a direction substantially coincident with the forward movement of said vehicle and a second group of digital doppler signals received when the antenna beam was pointing in the direction substantially opposite to the forward movement, gating means responsive to the coincidence of said output signals and said digital doppler signals to separate said digital doppler signals into a third group representing the movement of said vehicle along said predetermined path and a fourth group of doppler signals indicative of any deviation of said vehicle from said predetermined path, and means responsive to said doppler frequencies of said third and fourth groups to indicate the position of said vehicle along said predetermined path and any deviation of said vehicle from said predetermined path.

11. A doppler radar system for use on board a vehicle relative to a reradiating element comprising a source of radio signals, a beam radiating antenna coupled to said source and adapted to rotate about a given axis offset from the axis of said antenna, means to provide reference coordinates for a predetermined path for said vehicle, means coupled to said antenna and to said means to provide reference coordinates to produce output signals representing the position of said antenna beam relative said predetermined path, means to transmit said signal in a circular scan antenna pattern towards said element, means to receive reradiated signals from said element containing the doppler frequency, means to derive intermediate frequency signals containing the doppler frequency from said received signals, means to convert said intermediate frequency signals into digital signals, means to derive digital doppler signals from said intermediate frequency digital signals and means to separate said digital doppler signal into a first group of doppler signals received during the time when said antenna beam was pointing in a direction substantially coincident with the forward movement of said vehicle and a second group of digital doppler signals received when the antenna beam was pointing in the direction substantially opposite to the forward movement, means to convert said output signals into pulse signals related to the time when said antenna beam crosses the axes of said reference coordinates, gating means responsive to the coincidence of said pulse signals with said digital doppler signals of said first and second groups to separate said digital doppler signals into a third group representing the movement of said vehicle along said predetermined path and a fourth group of doppler signals indicative of the deviation of said vehicle from said predetermined path, and means responsive to said doppler frequencies of said third and fourth groups to indicate the position of said vehicle along said predetermined path and any deviation of said vehicle from said predetermined path.

12. A doppler radar system for use on board a vehicle relative to a reradiating element comprising a source of radio signals, a beam radiating antenna coupled to said source and adapted to rotate about a given axis offset from the axis of said antenna, means to provide reference coordinates for a predetermined path for said vehicle, means coupled to said antenna and to said means to provide reference coordinates to produce output signals representing the position of said antenna beam relative said predetermined path, means to transmit said signal in a circular scan antenna pattern towards said element, means to receive reradiated signals from said element containing the doppler frequency, means to derive intermediate frequency signals containing the doppler frequency from said received signals, means to convert said intermediate frequency signals into digital signals, means to derive digital doppler signals from said intermediate frequency digital signals, means to separate said digital doppler signal into a first group of doppler signals received during the time when said antenna beam was pointing in a direction substantially coincident with the forward movement of said vehicle and a second group of digital doppler signals received when the antenna beam was pointing in the direction substantially opposite to the forward movement, means to convert output signals into pulse signals related to the time when said antenna beam crosses the axes of said reference coordinates, gating means responsive to said pulse signals to separate said derived digital signals into a third group representing the movement of said vehicle along said predetermined path and a fourth group of doppler signals indicative of the deviation of said vehicle from said predetermined path, and means responsive to the digital signals of said third and fourth groups to indicate the position of said vehicle along said predetermined path and any deviation of said vehicle from said predetermined path.

13. A doppler radar system for use on board a vehicle relative to a reradiating element comprising a source of radio signals, a beam radiating antenna coupled to said source and adapted to rotate about a given axis offset from the axis of said antenna, means to provide reference coordinates for a predetermined path for said vehicle, means coupled to said antenna and to said means to provide reference coordinates to produce output signals representing the position of said antenna beam relative said predetermined path, means to transmit said signal in a circular scan antenna pattern towards said element, means to receive reradiated signals from said element containing the doppler frequency, means to derive intermediate frequency signals containing the doppler frequency from said received signals, means to convert said intermediate frequency signals into digital signals, means to derive digital doppler signals from said intermediate frequency digital signals, means to separate said digital doppler signals into a first group of doppler signals received during the time when said antenna beam was pointing in a direction substantially coincident with the forward movement of said vehicle and a second group of digital doppler signals received when the antenna beam was pointing in the direction substantially opposite to said forward movement, means to convert said output signals into pulse signals related to the time when said antenna beam crosses the axes of said reference coordinates, means to combine said digital doppler signals of said first and second group with said pulse signals representing the relation of said antenna scan with said reference coordinates to derive digital signals equal in number to said digital doppler frequency signals and separate said derived digital signals into a third group representing said vehicle along said predetermined path and a fourth group of doppler signals indicative of the deviation of said vehicle from said predetermined path, first counting means coupled to said doppler frequencies of said third group to indicate the position of said vehicle along said predetermined path and second counting means coupled to the digital doppler signal of said fourth group to indicate the deviation of said vehicle from said predetermined path.

14. A doppler radar system for use on board a vehicle relative to a reradiating element comprising a source of radio signals, a beam radiating antenna coupled to said source and adapted to rotate about a given axis offset from the axis of said antenna, resolving means to provide reference coordinates for a predetermined path for said vehicle, means coupled to said antenna and to said means to provide reference coordinates to produce output signals representing the position of said antenna beam relative said predetermined path, means to transmit said signal in a circular scan antenna pattern towards said element, means to receive reradiated signals from said element containing the doppler frequency, means to derive intermediate frequency signals containing the doppler frequency from said received signals, means to convert said intermediate frequency signals to digital intermediate frequency signals, a digital subtractor, means coupling said digital intermediate frequency signals containing the doppler signal to said digital subtractor to derive digital doppler signals from said digital intermediate frequency digital signals and to separate said digital doppler signals into a first group of doppler signals received during the time when said antenna beam was pointing in a direction substantially coincident with the forward movement of said vehicle and a second group of digital doppler signals received when the antenna beam was pointing in the direction substantially opposite to said forward movement, means to convert said output signals from said resolving means to pulse signals related to the time when said antenna beam crosses the axes of said predetermined path reference coordinates, means to combine said digital doppler signals of said first and second group with said pulse signals representing the relation of said antenna scan with said predetermined path reference coordinates to derive digital signals equal in number to said digital doppler frequency signals and separate said derived digital signals into a third group representing the movement of said vehicle along said predetermined path and a fourth group of doppler signals indicative of the deviation of said vehicle from said predetermined path, first counting means coupled to said doppler frequencies of said third group to indicate the position of said vehicle along said predetermined path and second counting means coupled to the digital doppler signal of said fourth group to indicate the deviation of said vehicle from said predetermined path.

15. A doppler radar system for use on board a vehicle relative to a reradiating element comprising a source of radio signals, a beam radiating antenna coupled to said source and adapted to rotate about a given axis offset from the axis of said antenna, means to provide reference coordinates for a predetermined path for said vehicle, means coupled to said antenna and to said means to provide reference coordinates to produce output signals representing the position of said antenna beam relative said predetermined path including a first resolver coupled to said antenna shaft, a source of reference signals coupled to the input of said first resolver, a second resolver coupled to a magnetic compass to provide fixed reference geographical direction, means coupling the output of said first resolver to the input of said second resolver, a third resolver adapted to provide reference coordinates for said predetermined path offset from said fixed reference geographical direction, means coupling the output of said second resolver to the input of said third resolver whereby the output of said third resolver is said reference signal modulated by the antenna scan rate, said output signals representing the position of said antenna beam relative said predetermined path as functions of the angle of rotation of said antenna scan pattern, means to transmit said signal in a circular scan antenna pattern towards said element, means to receive reradiated signals from said element containing the doppler frequency, means to derive intermediate frequency signals containing the doppler frequency from said received signals, means to convert said intermediate frequency signals to digital intermediate frequency signals, a digital subtractor, means coupling said digital intermediate frequency signals containing the doppler signal to said digital subtractor to derive digital doppler signals from said digital intermediate frequency digital signals and to separate said digital doppler signals into a first group of doppler signals received during the time when said antenna beam was pointing in a direction substantially coincident with the forward movement of said vehicle and a second group of digital doppler signals received when the antenna beam was pointing in the direction substantially opposite to said forward movement, means to compare said reference signals with said output signals from said third resolver to derive thereby pulse signals related to the time when said antenna beam crosses the axes of said predetermined path reference coordinates, means to combine said digital doppler signals of said first and second groups with said pulse signals representing the relation of said antenna scan with said predetermined path reference coordinates to derive digital signals equal in number to said digital doppler frequency signals and separate said derived digital signals into a third group representing the movement of said vehicle along said predetermined path and a fourth group of doppler signals indicative of the deviation of said vehicle from said predetermined path, first counting means coupled to said doppler frequencies of said third group to indicate the position of said vehicle along said predetermined path and second counting means coupled to the digital doppler signals of said fourth group to indicate the deviation of said vehicle from said predetermined path.

References Cited in the file of this patent
UNITED STATES PATENTS

| | | |
|---|---|---|
| 2,744,683 | Gray | May 8, 1956 |
| 2,853,700 | Cherry | Sept. 23, 1958 |
| 3,065,463 | Turner | Nov. 20, 1962 |